(12) United States Patent
Iwai et al.

(10) Patent No.: US 8,881,873 B2
(45) Date of Patent: Nov. 11, 2014

(54) BICYCLE DISC BRAKE ROTOR

(75) Inventors: Toru Iwai, Osaka (JP); Makoto Souwa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/352,842

(22) Filed: Jan. 18, 2012

(65) Prior Publication Data

US 2013/0180806 A1  Jul. 18, 2013

(51) Int. Cl.
*B62L 5/00* (2006.01)
*F16D 65/12* (2006.01)

(52) U.S. Cl.
USPC ..................................... 188/26; 188/218 XL

(58) Field of Classification Search
CPC .......... F16D 2200/0017; F16D 65/092; F16D 65/123; B62L 1/005; B62L 1/00
USPC ........... 188/26, 218 XL, 18 A, 251 A, 251 M
See application file for complete search history.

(56) References Cited

U.S. PATENT DOCUMENTS

| | | | |
|---|---|---|---|
| 4,808,275 A * | 2/1989 | Ohzora et al. | 205/109 |
| 5,626,211 A * | 5/1997 | Gewelber et al. | 188/218 XL |
| 7,416,060 B2 | 8/2008 | Takizawa | |
| 7,424,938 B2 | 9/2008 | Takizawa | |
| 2002/0066627 A1* | 6/2002 | Tsuge et al. | 188/218 XL |
| 2003/0010585 A1 | 1/2003 | Okada et al. | |
| 2005/0006186 A1 | 1/2005 | Iwai et al. | |
| 2006/0037819 A1* | 2/2006 | Takizawa | 188/26 |
| 2008/0000729 A1* | 1/2008 | Takizawa | 188/26 |
| 2011/0240420 A1 | 10/2011 | Souwa et al. | |
| 2012/0000736 A1 | 1/2012 | Koshiyama | |

* cited by examiner

*Primary Examiner* — Vishal Sahni
(74) *Attorney, Agent, or Firm* — Global IP Counselors, LLP

(57) ABSTRACT

A bicycle disc brake rotor is provided with a base rotor plate and a first layer. The base rotor plate includes an outer portion formed of iron. The outer portion has first and second base surfaces facing in opposite axial directions. The first layer overlies the first base surface of the outer portion of the base rotor plate to form a first outer surface. The first layer has a corrosion resistant characteristic which is superior to the base rotor plate.

20 Claims, 3 Drawing Sheets

US 8,881,873 B2

BICYCLE DISC BRAKE ROTOR

BACKGROUND

1. Field of the Invention

This invention generally relates to a bicycle disc brake rotor. More specifically, the present invention relates to a bicycle disc brake rotor with a configuration that promotes cooling of the braking surfaces.

2. Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or back wheel of a bicycle. The brake pads are pressed against a brake disc or rotor that is fixed to the wheel to slow down or stop the rotation of the disc, and thus, slow down or stop the rotation of the wheel.

SUMMARY

While disc brake systems provide excellent performance, the braking action tends to generate a substantial amount of heat in the disc brake rotor. Thus, one aspect of this disclosure is to provide a disc brake rotor with a configuration that more efficiently radiates heat from the outer portion of the disc brake rotor.

In general, an iron is never used as a matrix or base material of bicycle brake disc rotor. In particular, over time, iron will usually corrode and rust due to exposure to the environment. Furthermore, iron by itself does not have sufficient strength for being used as a bicycle disc brake rotor.

Basically, in view of the state of the known technology, a bicycle disc brake rotor is basically provided that comprises a base rotor plate and a first side layer. The base rotor plate includes an outer portion formed of iron. The outer portion has first and second base surfaces facing in opposite axial directions. The first side layer overlies the first base surface of the outer portion of the base rotor plate to form a first outer surface. The first side layer has a corrosion resistant characteristic which is superior to the base rotor plate.

These and other objects, features, aspects and advantages of the disclosed bicycle disc brake rotor will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
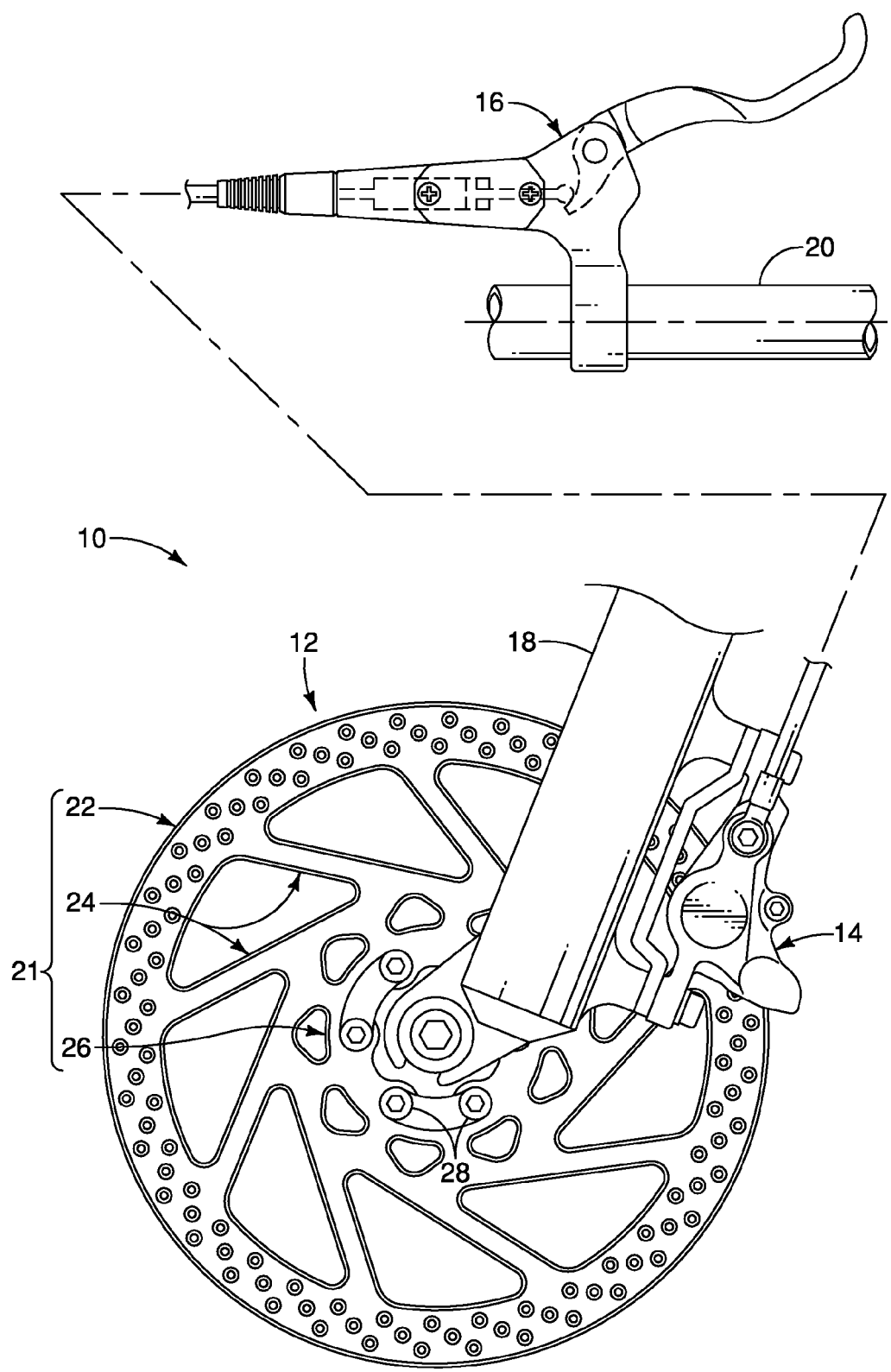
FIG. 1 is a partial side elevational view of a front disc brake system including a bicycle disc brake rotor in accordance with a first embodiment.

Referring initially to FIG. 1, a front disc brake system 10 is illustrated that includes a bicycle disc brake rotor 12 in accordance with a first embodiment. As explained below, the bicycle disc brake rotor 12 has a configuration that promotes cooling of the bicycle disc brake rotor 12. The front disc brake system 10 further includes a bicycle disc brake caliper 14 and a brake operating (actuating) mechanism 16. Basically, the bicycle disc brake rotor 12 is fixedly attached to a bicycle hub of a bicycle wheel (not shown). The bicycle disc brake caliper 14 is mounted to a bicycle fork 18, while brake operating mechanism 16 is attached to a bicycle handlebar 20. Since the operation and construction of the front disc brake system 10 is conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Figure 2:
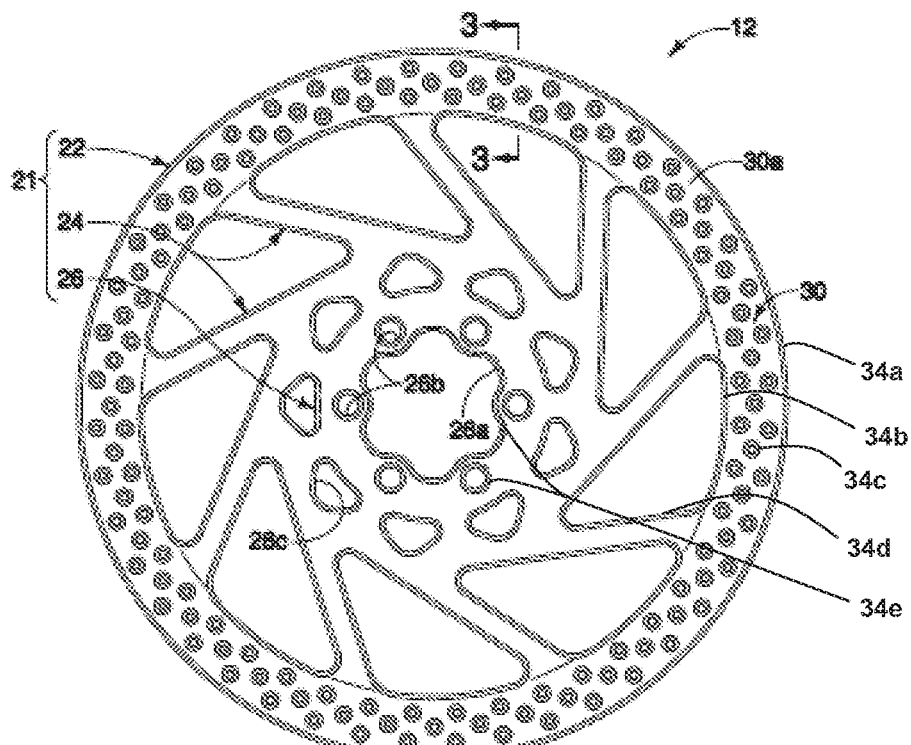
FIG. 2 is a side elevational view of the disc brake rotor illustrated in FIG. 1.

As seen in FIG. 2, the bicycle disc brake rotor 12 has a base rotor plate 21 that basically includes an outer portion 22, a plurality of connecting arms 24 extending radially inward from the outer portion 22, and a hub mounting portion 26 coupled to inner ends of the connecting arms 24. Here in the first illustrated embodiment, the outer portion 22, the connecting arms 24 and the hub mounting portion 26 are integrally formed as a one-piece member of iron. For example, the base rotor plate 21 can be formed by stamping a cold rolled carbon steel sheet (e.g., JIS G 3141 SPCC) to the desired shape. Although iron does not by itself does not have sufficient strength for being used as a bicycle disc brake rotor, iron has a very good heat transfer efficiency (i.e., 80 W/mK), which is about three or four times greater than stainless steel (i.e., 20 W/mK).

The outer portion 22 of the base rotor plate 21 has an outer peripheral edge 22a and an inner peripheral edge 22b. The connecting arms 24 extend radially inward from the inner peripheral edge 22b of the outer portion 22. The hub mounting portion 26 is coupled to the inner ends of the connecting arms 24. As illustrated in FIG. 1, the hub mounting portion 26 is coupled by fasteners 28 (e.g., bolts) to the bicycle hub. While the base rotor plate 21 is illustrated as a one-piece member, the base rotor plate 21 can be made of more a one piece if needed and/or desired. In the case of the first illustrated embodiment, the base rotor plate 21 has first and second base surfaces 21a and 21b that face in opposite axial directions of the bicycle disc brake rotor 12. The first and second base surfaces 21a and 21b are flat surfaces that extend over the outer portion 22, the connecting arms 24 and the hub mounting portion 26. However, the first and second base surfaces 21a and 21b do not need to be entirely flat. For example, the first and second base surfaces 21a and 21b can be contoured in the areas of the connecting arms 24 and the hub mounting portion 26. Moreover, the outer portion 22 can have recesses instead of through holes as shown. In any case, the outer portion 22 of the base rotor plate 21 includes at least a portion of the first and second base surfaces 21a and 21b that face in opposite axial directions of the bicycle disc brake rotor 12.

Figures 3, 4:
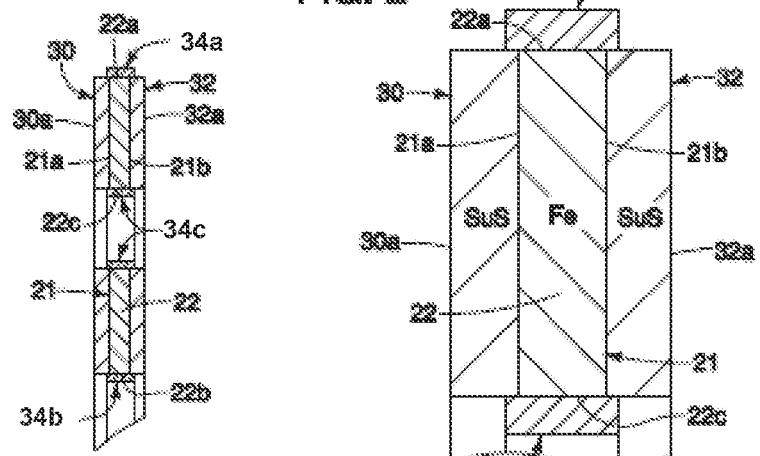
FIG. 3 is a partial cross sectional view of the bicycle disc brake rotor illustrated in FIGS. 1 to 4 as seen along section line 3-3 of FIG. 2.
FIG. 4 is an enlarged, partial cross sectional view of a portion of the bicycle disc brake rotor illustrated in FIG. 3.

Referring to FIGS. 3 and 4, the bicycle disc brake rotor 12 further includes a first side layer 30, a second side layer 32 and peripheral layers 34. For the sake of illustration, the thicknesses of the first and second side layers 30 and 32 and the peripheral layers 34 have been exaggerated. Typically, for example, the total outer rotor thickness of the outer portion 22 of the base rotor plate 21 is in a range of about 1.8 millimeters to about 2.4 millimeters. Thus, in the depicted embodiment, the thickness of each of the first and second side layers 30 and 32 is about 0.02 millimeter, and the thickness of the peripheral layers 34 is about 0.02 millimeter. The thicknesses of the first and second side layers 30 and 32 can be the same as illustrated or different as needed and/or desired. In any case, preferably, the thickness of the base rotor plate 21 between the first and second base surfaces 21a and 21b is greater than the thicknesses of the first and second side layers 30 and 32 and/or the thickness of thickness of the peripheral layers 34. Of course, these dimensions can vary from the above-mentioned dimensions as needed and/or desired.

Each of the first and second side layers 30 and 32 has a corrosion resistant characteristic which is superior to material (iron) of the base rotor plate 21. The first and second side layers 30 and 32 are preferably corrosive resistant metallic layers. More preferably, the first and second side layers 30 and 32 are formed of stainless steel layers. Using stainless steel to cover the first and second base surfaces 21a and 21b will protect and strengthen the iron of the base rotor plate 21. In this way, iron can be used as the matrix or base material that forms the base rotor plate 21 of the bicycle disc brake rotor 12. The first and second side layers 30 and 32 are mechanically secured or bonded to the first and second base surfaces 21a and 21b. In other words, the first and second side layers 30 and 32 are not chemically bonded to the first and second base surfaces 21a and 21b (i.e., no chemical bonding occurs between the first and second side layers 30 and 32 and the iron of the base rotor plate 21. In the illustrated embodiment, the first and second side layers 30 and 32 are also disposed on the connecting arms 24 and the hub mounting portion 26.

The first and second side layers 30 and 32 can be secured or bonded to the base rotor plate 21 in several ways. In the illustrated embodiment, for example, the first and second side layers 30 and 32 can be performed plates that are attached by the peripheral layers 34 and/or directly fastened or bonded to the first and second base surfaces 21a and 21b of the base rotor plate 21 using an adhesive, welding or brazing material (ex. Copper brazing filer metal, Copper and Alloy brazing filer metal, Nickel brazing filer metal, Aluminum brazing filer metal or Silver brazing filer metal) Alternatively, for example, the first and second side layers 30 and 32 can be bonded to the first and second base surfaces 21a and 21b of the base rotor plate 21 by using a metal cladding process (metallurgically bonding) so as to form a pair of cladding layers on the base rotor plate 21. Also, for example, the first and second side layers 30 and 32 can be fastened to the base rotor plate 21 using one or more fasteners such as rivets. However, preferably fasteners such as rivets are not used to fasten the first and second side layers 30 and 32 to the base rotor plate 21. In any case, the first side layer 30 at least overlies the first base surface 21a along the outer portion 22 of the base rotor plate 21 to form a first outer surface. The second side layer 32 at least overlies the second base surface 21b along the outer portion 22 of the base rotor plate 21 to form a second outer surface. Thus, the sections of the first and second outer surfaces 30a and 32a that overlie the outer portion 22 constitute first and second braking surfaces of the bicycle disc brake rotor 12. Thus, the sections of the first and second outer surfaces 30a and 32a that overlie the outer portion 22 are directly contacted by the brake pads of the bicycle disc brake caliper 14. As a result, in the first embodiment, the first and second side layers 30 and 32 of stainless steel are secured to an iron core of the base rotor plate 21 to provide both the durability and powerful braking properties of stainless and the heat dissipation of iron.

As seen in FIGS. 3 and 4, the peripheral layers 34 are preferably made of a brazing filler metal (ex. Copper brazing filer metal, Copper and Alloy brazing filer metal, Nickel brazing filler metal. Aluminum brazing filler metal or Silver brazing filling filler metal) having a corrosion resistant characteristic which is superior to the base rotor plate 21. The peripheral layers 34 constitute a connecting part or layer that mechanically connects the first and second side layers 30 and 32 together. The peripheral layers 34 are a different material from the first and second side layers 30 and 32. However, the peripheral layers 34 can be made of the same material as the first and second side layers 30 and 32 if needed and/or desired. In the illustrated embodiment, the peripheral layers 34 are disposed on all exposed peripheral edges of the base rotor plate 21. In other words, the edges of the outer portion 22 (including edges 22c of openings in the outer portion 22), the connecting arms 24 and the hub mounting portion 26 are covered by first, second, third, fourth, and fifth peripheral layers 34a, 34b, 34c, 34d and 34e, respectively. In this way, the peripheral layers 34 prevent corroding and rusting of the edges of the base rotor plate 21. Also the peripheral layers 34 provide reinforcement to the base rotor plate 21 by mechanically connecting the first and second side layers 30 and 32 together. The peripheral layers 34 are applied to all of the exposed peripheral edges of the base rotor plate 21 by a suitable process such as a metal cladding process (metallurgically bonding), brazing, etc. that results in the filler metal of the peripheral layers 34 to cover and/or coat the exposed peripheral edges of the base rotor plate 21. Preferably, the filler metal of the peripheral layers 34 also covers and/or coats part of the first and second side layers 30 and 32 in an overlapping manner as shown in FIGS. 3 and 4.

Depending on the configuration of the base rotor plate 21 and the configuration of the first and second side layers 30 and 32, one or both of the outer and inner peripheral edges 22a and 22b of the outer portion 22 may be covered by the first and/or second peripheral layers 34a and 34b. Preferably, the first and second peripheral layers 34 cover at least one of the outer and inner peripheral edges 22a and 22b of the outer portion 22. As seen in FIG. 3, in the illustrated embodiment, the first and second peripheral layers 34a and 34b cover both of the outer and inner peripheral edges 22a and 22b of the outer portion 22. As seen in FIG. 3, the third peripheral layers 34 also cover edges 22c that define openings in the outer portion 22. The first, second and third peripheral layers 34a, 34b and 34c preferably partially overlap with the first and second side layers 30 and 32 as see in FIGS. 3 and 4. In this way, the first, second, and third peripheral layers 34 also mechanically connect the first and second side layers 30 and 32 together.

Further in the illustrated embodiment, the fourth and fifth peripheral layers 34d and 34e cover the edges of the connecting arms 24 and the hub mounting portion 26 in the same manner as the first, second and third peripheral layers 34a-34c cover the edges of the outer portion 22. Thus, the fourth and fifth peripheral layers 34d and 34e cover the side peripheral edges 24a and 24b of the connecting arms 24, and the peripheral edges 26a and 26b of the hub mounting portion 26. The peripheral edge 26a of the hub mounting portion 26 defines the center opening of the hub mounting portion 26, while the peripheral edges 26b of the hub mounting portion 26 define a plurality of fastener openings. The area of the hub mounting portion 26 between the fastener openings defined by the peripheral edges 26b has a plurality of openings defined by peripheral edges 26c that are also covered by the peripheral layers 34e.

Figure 5:
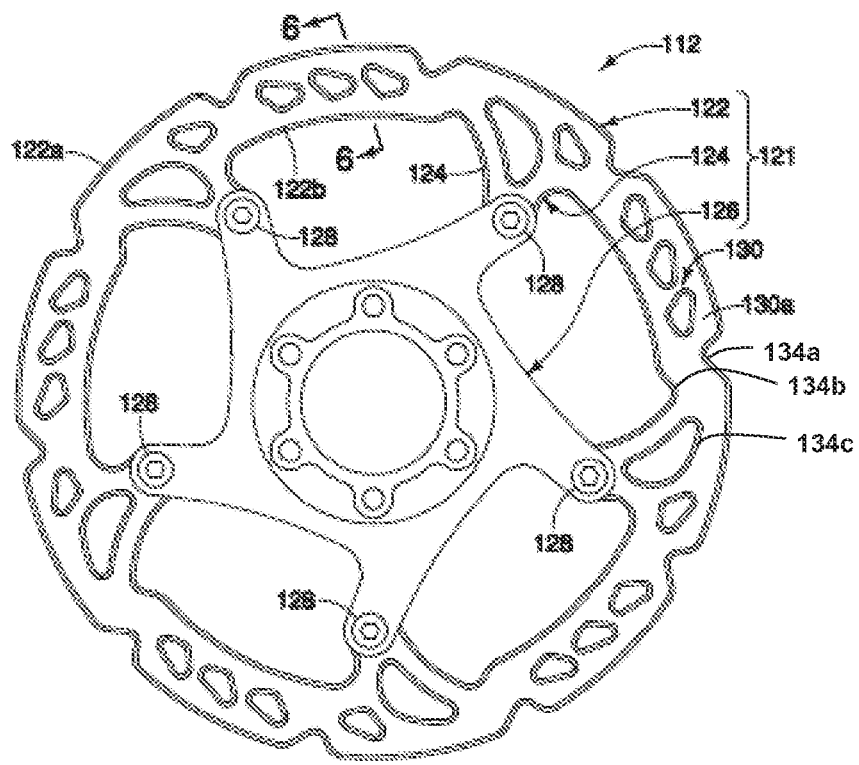
FIG. 5 is a side elevational view of a bicycle disc brake rotor in accordance with a second embodiment.
Figures 6, 7:
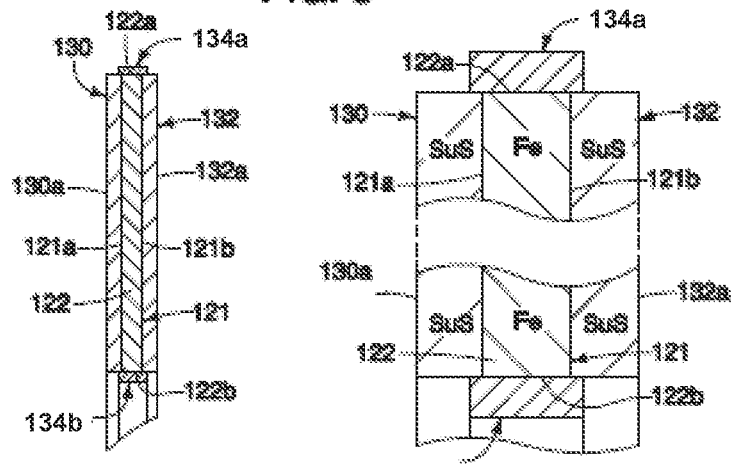
FIG. 6 is a partial cross sectional view of the bicycle disc brake rotor illustrated in FIG. 5 as seen along section line 6-6 of FIG. 5.
FIG. 7 is an enlarged, partial cross sectional view of a portion of the bicycle disc brake rotor illustrated in FIG. 6.

As seen in FIGS. 5 to 7, a bicycle disc brake rotor 112 is illustrated in a accordance with a second embodiment. Here, the bicycle disc brake rotor 112 includes a base rotor plate 121 made of iron. The base rotor plate 121 includes an outer portion 122 and a plurality of connecting arms 124. The connecting arms 124 extend radially inward from the outer portion 122 to free ends that have a fastener receiving hole. A hub mounting portion 126 is coupled to inner ends of the connecting arms 124 by a plurality of fasteners 128. Thus, the hub mounting portion 126 is a separate piece from the outer portion 122 and the connecting arms 124 in the second embodiment. The outer portion 122 and the connecting arms 124 are constructed in an identical manner as the first embodiment. In other words, the bicycle disc brake rotor 112 further includes a first side layer 130, a second layer 132 and first, second and third peripheral layers 134a, 134b and 134c. The first and second side layers 130 and 132 are preferably stainless steel layers. Using stainless steel to cover the first and second base surfaces 121a and 121b will protect and strengthen the iron of the base rotor plate 121. In this way, iron can be used as the matrix or base material that forms the base rotor plate 121 of the bicycle disc brake rotor 112. The first and second side layers 130 and 132 are mechanically secured to the first and second base surfaces 121a and 121b to overlie the outer portion 122 and the connecting arms 124 in the same manner as the first embodiment. The hub mounting portion 126 can be constructed as a one piece, unitary member using conventional manufacturing methods or can be made of several pieces as needed and/or desired. In view of the similarities between the bicycle disc brake rotors 12 and 112, the bicycle disc brake rotor 112 will not be discussed in further detail. While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake rotor comprising:
a base rotor plate including an outer portion formed of iron, the outer portion having first and second base surfaces facing in opposite axial directions, the outer portion having an outer peripheral edge defining a radially outermost surface of the bicycle disc brake rotor;
a first side layer overlying the first base surface of the outer portion of the base rotor plate to form a first outer surface, the first side layer having a corrosion resistant characteristic which is superior to the base rotor plate; and
at least one peripheral layer made of a different material from the first side layer and having a corrosion resistant characteristic which is superior to the base rotor plate, the at least one peripheral layer including a first peripheral layer covering the outer peripheral edge of the outer portion.

2. The bicycle disc brake rotor according to claim 1, wherein
the outer portion has an inner peripheral edge that defines a radially innermost surface of the outer portion; and
the at least one peripheral layer further includes a second peripheral layer covering the inner peripheral edge of the outer portion.

3. The bicycle disc brake rotor according to claim 1, wherein
the at least one peripheral layer is made of a brazing filler metal.

4. The bicycle disc brake rotor according to claim 1, wherein
the first side layer is a stainless steel layer.

5. The bicycle disc brake rotor according to claim 1, wherein
the first side layer is bonded to the first base surface.

6. The bicycle disc brake rotor according to claim 1, wherein
the at least one peripheral layer overlaps a part of the first side layer.

7. The bicycle disc brake rotor according to claim 1, wherein
the at least one peripheral layer includes third peripheral layers covering edges that define openings in the outer portion.

8. The bicycle disc brake rotor according to claim 1, wherein
the base rotor plate further includes a plurality of connecting arms that extend radially inward from the outer portion, the at least one peripheral layer including fourth peripheral layers covering a peripheral edge of each of the connecting arms.

9. The bicycle disc brake rotor according to claim 8, wherein
the base rotor plate further includes a hub mounting portion coupled to inner ends of the connecting arms, the at least one peripheral layer further includes a fifth peripheral layer covering a peripheral edge of the hub mounting portion, the peripheral edge of the hub mounting portion including at least one of a peripheral edge of a center opening of the hub mounting portion and a peripheral edge of a fastener opening of the hub mounting portion.

10. The bicycle disc brake rotor according to claim 1, wherein
the first peripheral layer extends around an entire circumference the outer peripheral edge of the outer portion.

11. A bicycle disc brake rotor comprising:
a base rotor plate including an outer portion formed of iron, the outer portion having first and second base surfaces facing in opposite axial directions, the outer portion having an outer peripheral edge defining a radially outermost surface of the bicycle disc brake rotor;
a first side layer overlying the first base surface of the outer portion of the base rotor plate to form a first outer surface, the first side layer having a corrosion resistant characteristic which is superior to the base rotor plate;
a second side layer overlying the second base surface of the outer portion of the base rotor plate to form a second outer surface, the second side layer having a corrosion resistant characteristic which is superior to the base rotor plate; and
at least one peripheral layer made of a different material from the first side layer and having a corrosion resistant characteristic which is superior to the base rotor plate, the at least one peripheral layer including a first peripheral layer covering the outer peripheral edge of the outer portion.

12. The bicycle disc brake rotor according to claim 11, wherein
the at least one peripheral layer is a brazing filler metal.

13. The bicycle disc brake rotor according to claim 11, wherein
the first and second side layers are stainless steel layers.

14. The bicycle disc brake rotor according to claim 11, wherein
the first and second side layers are bonded to the first and second base surfaces.

15. The bicycle disc brake rotor according to claim 11, wherein
the at least one peripheral layer overlaps a part of the first side layer and a part of the second side layer.

16. The bicycle disc brake rotor according to claim 15, wherein
the outer portion has an inner peripheral edge that defines a radially innermost surface of the outer portion; and
the at least one peripheral layer further includes a second peripheral layer covering the inner peripheral edge of the outer portion.

17. The bicycle disc brake rotor according to claim 16, wherein
the base rotor plate further includes a plurality of connecting arms that extend radially inward from the outer portion, the at least one peripheral layer further including fourth peripheral layers covering a peripheral edge of each of the connecting arms.

18. The bicycle disc brake rotor according to claim 17, wherein
the base rotor plate further includes a hub mounting portion coupled to inner ends of the connecting arms, the at least one peripheral layer further includes a fifth peripheral layer covering a peripheral edge of the hub mounting portion, the peripheral edge of the hub mounting portion including a peripheral edge of a center opening of the hub mounting portion and peripheral edges of fastener openings of the hub mounting portion.

19. The bicycle disc brake rotor according to claim 17, wherein
each of the first and second side layers is a stainless steel layer, and the at least one peripheral layer is a brazing filler metal.

20. A bicycle disc brake rotor comprising:
a base rotor plate including an outer portion formed of iron, the outer portion having first and second base surfaces facing in opposite axial directions, the outer portion having an inner peripheral edge that defines a radially innermost surface of the bicycle disc brake rotor;
a first side layer overlying the first base surface of the outer portion of the base rotor plate to form a first outer surface, the first side layer having a corrosion resistant characteristic which is superior to the base rotor plate; and
at least one peripheral layer made of a different material from the first side layer and having a corrosion resistant characteristic which is superior to the base rotor plate, the at least one peripheral layer including a first peripheral layer covering the inner peripheral edge of the outer portion.

* * * * *